United States Patent
Kirovski et al.

(10) Patent No.: US 7,562,228 B2
(45) Date of Patent: Jul. 14, 2009

(54) FORENSIC FOR FINGERPRINT DETECTION IN MULTIMEDIA

(75) Inventors: Darko Kirovski, Kirkland, WA (US); Daniel Schonberg, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 889 days.

(21) Appl. No.: 11/081,141

(22) Filed: Mar. 15, 2005

(65) Prior Publication Data

US 2006/0212704 A1   Sep. 21, 2006

(51) Int. Cl.
*G06F 21/001* (2006.01)
(52) U.S. Cl. .............. 713/186; 713/176; 382/100; 382/116; 382/124; 382/232; 725/136
(58) Field of Classification Search .............. 713/176, 713/186; 382/232, 100, 116, 124; 707/104.1; 725/136

See application file for complete search history.

(56) References Cited

U.S. PATENT DOCUMENTS 5,630,126 A    5/1997  Redpath

2004/0172411 A1 * 9/2004 Herre et al. .............. 707/104.1
2005/0154892 A1 * 7/2005 Mihcak et al. .............. 713/176

OTHER PUBLICATIONS

LeBlond et al, "PC Magazine Guide to Quattro Pro for Windows", pp. 9-11, 42-61, Ziff-Davis Press, Copyright 1993 by the LeBlond Group.
Bruce Hollberg et al. "Using Microsoft Excel 97" (Public Release 1997, By Que Corporation) pp. 581-590,85-89,209-210,190-201,712-714.
Laura Acklen & Read Gilgen, "Using corel Wordperfect 9", 251-284,583-586 (1998).

* cited by examiner

*Primary Examiner*—Thanhnga B Truong
(74) *Attorney, Agent, or Firm*—Lee & Hayes, PLLC

(57) ABSTRACT

The subject matter includes systems, engines, methods, and schemata for embedding spread-spectrum fingerprints in multimedia content: a first fingerprint to identify a recipient of the multimedia content and a second fingerprint at a location in the first fingerprint that represents a subset of a much larger group of recipients. By locating the second fingerprint, the search for a media pirate is immediately narrowed down to the subset, thus immensely speeding up pirate identification. In one implementation, chips of the second fingerprint can be made small and embedded sparsely, making alteration difficult. Systems, engines, methods, and schemata for synchronizing a pirated copy with original multimedia content to facilitate fingerprint recovery are also described.

21 Claims, 10 Drawing Sheets

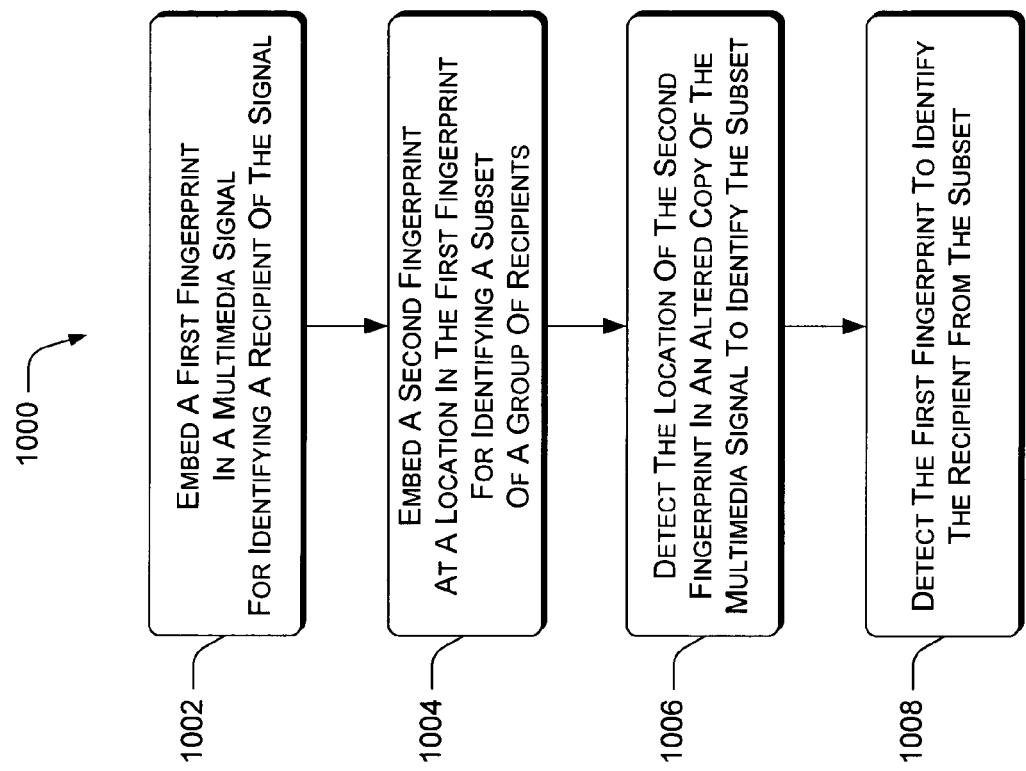

FORENSIC FOR FINGERPRINT DETECTION IN MULTIMEDIA

TECHNICAL FIELD

The subject matter described herein relates generally to multimedia watermarking and more specifically to a forensic for fingerprint detection in multimedia.

BACKGROUND

One of the prime reasons movie and music studios have ignored the Internet for open-networked multimedia content delivery, has been the lack of a technology that can support a secure digital rights management (DRM) system on a general purpose computer. The difficulty of building effective multimedia DRM stems from the fact that traditional cryptographic primitives such as encryption or scrambling do not protect audio or video signals once they are played in plaintext. This fact, commonly referred to as "the analog hole" has been responsible for the popularity of multimedia file sharing which cannot be controlled, at least technically, by the content's copyright owners.

Significantly increasing levels of multimedia piracy have put the movie and music industries under pressure to deploy a standardized anti-piracy technology for multimedia content. Initiatives, such as the Secure Digital Music Initiative (SDMI) and the Digital Versatile Disk (DVD) Copy Control Association (CCA) have been established to develop open technology specifications that protect the playing, storing, and distributing of digital music and video. Unfortunately, a DRM system that can provide a cryptographic level of multimedia protection has yet to be developed. The problem of ensuring copyright of multimedia at the client side lies in the fact that traditional data protection technologies such as encryption or scrambling cannot be applied exclusively as they are prone to the aforementioned analog hole—to digital copying or analog re-recording. The moment a potential pirate obtains an analog copy of the multimedia clip, its copyright owners, at least technically, lose control over the content's distribution. Thus, almost all modern copyright protection mechanisms tend to rely to a certain extent on tracking down pirates through watermarks: imperceptible and secret marks hidden in host signals. Two different types of protection systems have evolved over the past decade: content screening and fingerprinting.

In a typical content screening scenario, a copyright owner protects distribution rights simply by hiding a unique and secret watermark in the multimedia clips. While both the original multimedia content as well as the key used to generate the secret must be safely guarded by the owner, the marked copy can be distributed using a public communication channel such as the Internet. In general, the marked content can be distributed in analog form over the communication channel. The client's media player searches the distributed content for hidden information without needing to compare the content with the original content in order to find the hidden information. This type of watermark detection is referred to as "blind." If the secret mark is detected, the player must verify, prior to playback, whether it has a license to play the content. Only in the case that the license is valid, does the media player play the protected clip. By default, unmarked content is considered to be unprotected and is played without any barriers. Hence, a content screening system consists of two subsystems: a watermark detector and a DRM agent which handles license management via standard cryptographic tools. An example of a DRM agent is the MICROSOFT® MEDIA PLAYER® 9 DRM system (Microsoft Corporation, Redmond, Wash.).

An important element for a content screening system is BORE-resistance. BORE is an abbreviation for "break once, run everywhere," a typical vulnerability of content screening systems. Note that if the key used to detect the watermark is the same secret key used to mark the original clips, by breaking one player, an adversary gains access to the master secret key and as a consequence, can mark or remove marks from content at will. In order to be BORE-resistant, a content screening secret must deploy either a public-key content screening system, much like existing public-key cryptosystems (e.g., the Rivest-Shamir-Adleman system—RSA) or tamper-proof hardware and software. (See, R. L. Rivest, A. Shamir, and L. A. Adleman, "A method for obtaining digital signatures and public-key cryptosystems," *Communications of the ACM*, vol. 21, no. 2, pp. 120-6, 1978.) Neither of these two goals has been fully achieved to date. But progress has been made on public-key watermarking by D. Kirovski, H. Malvar, and Y. Yacobi, in "A dual watermarking and fingerprinting system," *ACM Multimedia*, pp. 372-81, 2002.

Hence, many content owners rely on fingerprinting. In a typical scenario that uses multimedia watermarking for forensic purposes, studios create a uniquely marked content copy for each individual user request. The fingerprinted copy is securely distributed to the user who plays the content using a media player which is unmodified compared to modern media players. Certain users may choose to illegally distribute this content. The media studios deploy search robots in order to find content copies on the Internet. Illegally distributed content is retrieved, and based upon the known user database as well as the original clip, media studios use forensic analysis tools to identify pirates. But even fingerprints are successfully attacked and nullified through a host of techniques that render the fingerprint unreadable or unreliable to forensic analysis tools. A great deal of time and effort can also be expended to recover a fingerprint and then correlate the fingerprint with a user from a large database of users. There is a need for multimedia fingerprints that are more imperceptible, robust, and reliable than conventional fingerprints, and for techniques that are faster and more reliable than conventional techniques for identifying pirates.

SUMMARY

The subject matter includes systems, engines, methods, and schemata for embedding spread-spectrum fingerprints in multimedia content: a first fingerprint to identify a recipient of the multimedia content and a second fingerprint at a location in the first fingerprint that represents a subset of a much larger group of recipients. By locating the second fingerprint, the search for a media pirate is immediately narrowed down to the subset, thus immensely speeding up pirate identification. In one implementation, chips of the second fingerprint can be made small and embedded sparsely, making alteration difficult. Systems, engines, methods, and schemata for synchronizing a pirated copy with original multimedia content to facilitate fingerprint recovery are also described.

BRIEF DESCRIPTION OF THE DRAWINGS

FIG. 10 is a flow diagram of an exemplary method of detecting a media pirate.

DETAILED DESCRIPTION

Overview

Figure 1:
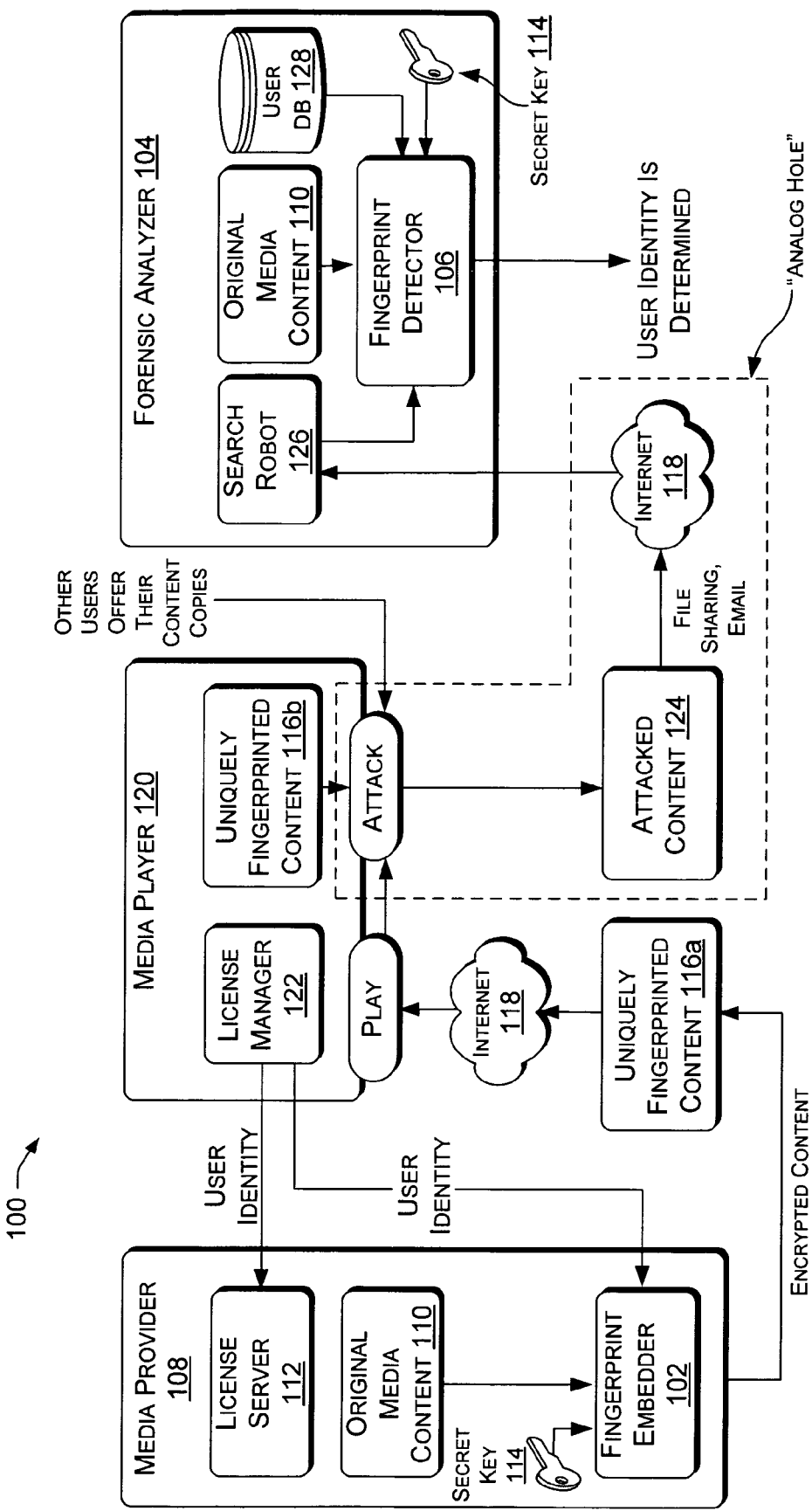
FIG. 1 is a block diagram of an exemplary system for performing forensic analysis of pirated multimedia content.

The exemplary systems, engines, methods, and schemata described herein improve media fingerprinting, providing increased imperceptibility, robustness, reliability, and speed of detection. A fingerprint generally consists of a watermark hidden in a media signal that identifies an individual user or entity. Although digital encryption can protect copyrighted media content during digital transmission, the digital protection ends when the content is rendered in analog form for human consumption. This "analog hole" presents problems of unauthorized copying and distribution of the content in its most vulnerable form. The task of preventing unauthorized duplication when the media content is in analog form has proven difficult, so an alternate strategy that does not rely on encryption is often used instead. A nearly imperceptible fingerprint representing a recipient user can be added to the content so that illicitly distributed copies can be tracked down and pirates identified if the fingerprint can be recovered from a copy.

An ideal fingerprint is imperceptible and so closely associated with the part of the media signal for which protection is desired that modifying the fingerprint ruins or degrades the content. To accomplish this, the fingerprint is usually associated with an audible component of an audio signal or a visible component of a video signal so that tampering with the fingerprint also ruins the part of the content that humans most enjoy hearing and seeing. Fingerprints added to inaudible or invisible portions of a media signal are not very effective as they are easily attacked or removed without altering the enjoyable part of the media content.

Since there can be any number of media recipients and therefore any number of fingerprints embedded in different copies of a given piece of audio or video art distributed as media content, the task of finding an individual pirate can be very processor intensive, i.e., slow and time consuming. An exemplary forensic fingerprint system as described herein therefore includes many features that improve upon conventional fingerprinting techniques.

First, implementations of the subject matter described herein may include a fingerprint detection accelerator that uses exemplary pilot fingerprints to greatly speed up the process of finding pirates. Pilot fingerprints likewise speed up detection of collusion cliques and foil frame-ups of innocent non-pirates. The pilot fingerprinting technology described herein makes it almost logically impossible to frame an innocent third party through a collusion attack as compared with other fingerprinting techniques (see, for example, D. Boneh and J. Shaw, "Collusion-secure fingerprinting for digital data," *IEEE Transactions on Information Theory*, vol. 44, no. 5, pp. 1897-1905, 1998; or Y. Yacobi, "Improved Boneh-Shaw fingerprinting," *RSA Conference*, pp. 378-91, 2001).

Second, implementations of the subject matter may also include a synchronizer. The synchronizer realigns audio and video media that have been altered by one or more pirates back into alignment with an original copy of the media, thereby reversing many kinds of attacks in order to recover fingerprints.

Third, implementations of the subject matter may also include better stealth measures for hiding the fingerprints. These measures embed fingerprints in ways that increase imperceptibility and increase resistance to attack and removal. For example, a stealth engine may combine a spread-spectrum, bounded Gaussian fingerprint tactic and then avoid embedding fingerprints in parts of media blocks where the fingerprint might be heard or seen as noise. A smoothing engine may also be included to soften the presence of the fingerprints, rendering the fingerprints difficult for pirates to perceive and confounding conventional attempts to negate fingerprints by incrementally altering, averaging, and/or "de-synching" the speed, frequency, and/or wavelength of fingerprinted media signals.

Exemplary System

FIG. 1 shows an exemplary media distribution system 100 that includes a fingerprint embedder 102 that can embed the pilot fingerprints introduced above. The system 100 also includes a forensic analyzer 104 that has a fingerprint detector 106. The fingerprint detector 106 uses the synchronizer, introduced above, to realign pirated audio or video with the original content, in order to recover attacked fingerprints.

In one implementation of the media distribution system 100, a media provider 108 controls original media content 110, typically protected by copyright. The media provider 108 may use a license server 112 to distribute digital rights in the content for a monetary charge. The fingerprint embedder 102 may use at least one secret key 114 to create fingerprints and/or encrypt the content for transmission. The fingerprint embedder 102 may include a stealth engine, as introduced above, to hide fingerprints in a manner that they are more resistant to attack than conventional fingerprints.

Media player 120 receives uniquely fingerprinted media content 116a from media provider 108. Because the original media content 110 may be distributed in response to a user request, the one or more fingerprints in the uniquely fingerprinted content 116a will often represent or at least point to the requesting user's identity. The uniquely fingerprinted content 116a with the user's fingerprint is sent via a network, such as the Internet 118, to the user.

Media player 120 typically has a license manager 112 onboard to receive permissions from the media provider 108 to play the unique fingerprinted content 116b. Playing the content typically involves rendering the content into an unprotected form for human consumption—the "analog hole."

In an example attack on the fingerprint, multiple different users who have legitimately received their own copies of the content marked with their own respective unique fingerprints compare a combination of their respective copies in order to filter out, e.g., by averaging, the original media content 110 that is common to all fingerprinted versions from the "leftover" fingerprint signals. Success in defeating the fingerprint(s) may consist in merely weakening fingerprint signals to the point where it is difficult for the media provider 108 to recover a fingerprint to identify pirates. In a variation, the colluders produce a version of the content that has a new fingerprint that frames an innocent third party, an insidious form of identity theft. The attacked content 124 is disseminated without authorization via file sharing and email, e.g., over the Internet 118.

To find out who is distributing unauthorized copies, the media provider 108 employs the aforementioned forensic analyzer 104, which includes search robots 126 to locate unauthorized copies, i.e., attacked content 124, at various websites on the Internet 118. The forensic analyzer 104 has the advantage of performing "non-blind" fingerprint detection, as the media provider 108 is in possession of the original media content 110, the secret key 114, if used, and a user database 128 correlating each recovered pilot fingerprint to a group of users, and each non-pilot fingerprint to a specific user.

The synchronizer in the fingerprint detector 106 can include a maximum-likelihood similarity searcher that recovers a viable fingerprint despite many kinds of severe attacks on the fingerprint—that is, the similarity searcher can resynchronize attacked content 124 in order to detect and recover fingerprints despite the best efforts of pirates to make the embedded fingerprint(s) unrecoverable. The fingerprint detector 106 can find pirates much more rapidly than conventional techniques because once the attacked content 124 is resynchronized, recovery of a pilot fingerprint, to be discussed more fully below, immediately identifies a relatively small group of users, thereby avoiding a great deal of extra processing. After identifying a reduced set of users that includes the individual pirate, it is a relatively easy step to identify a pirate member of the group.

A pilot fingerprint identifies (e.g., by its location) a relatively small group of users that includes the individual pirate. The pilot fingerprint is embedded in a "larger" fingerprint that identifies the individual pirate. Because the two fingerprints relate to each other, it is very difficult if not impossible for a group of colluders to frame an innocent third party by altering the fingerprint to point to someone outside the group. For one thing, the colluders have no way to know who is in the group represented by the pilot fingerprint. Thus, pilot fingerprints provide a nearly foolproof way to eliminate the possibility of misidentifying an innocent third party who has been framed by a clique of colluding pirates.

Figure 2:
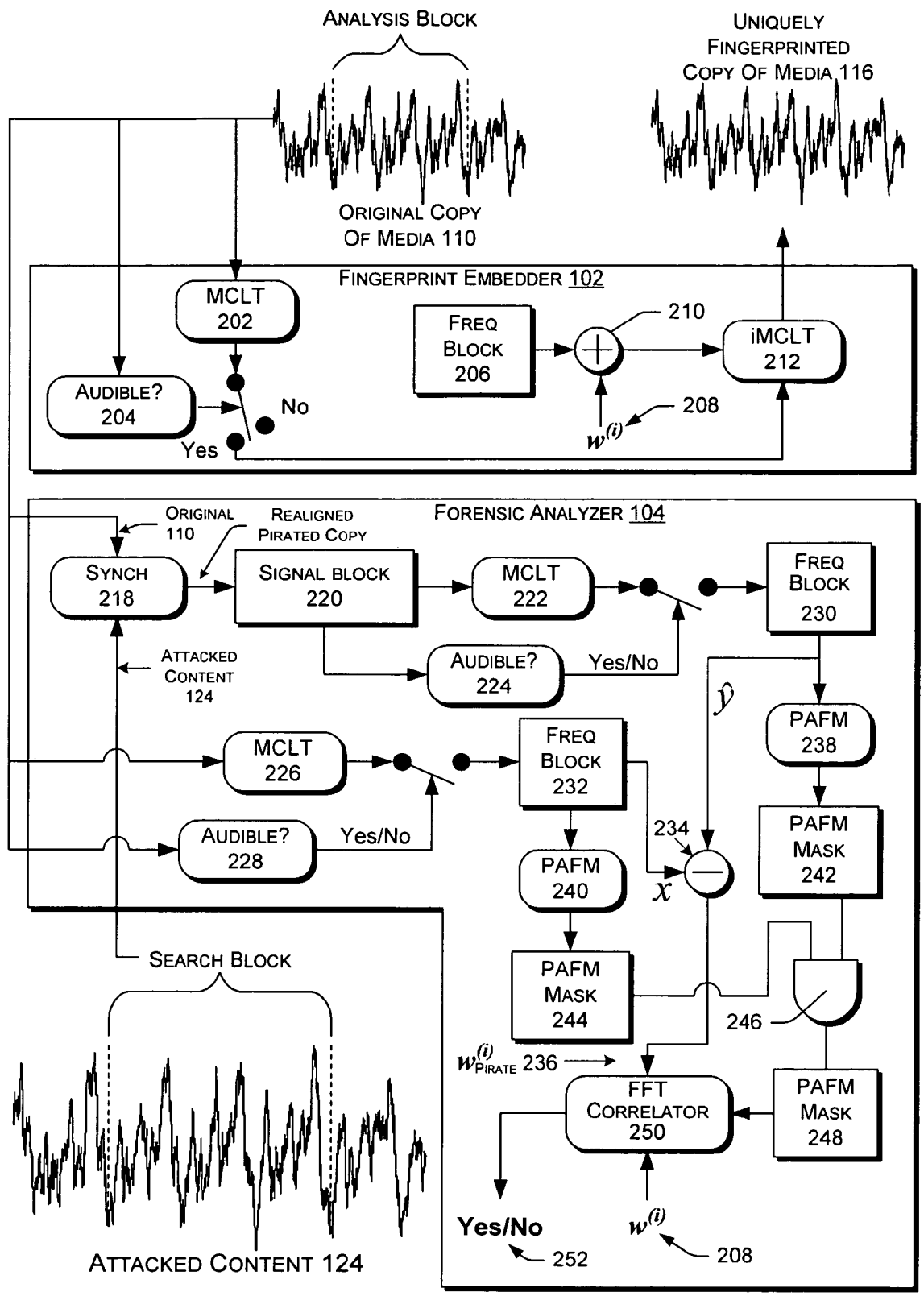
FIG. 2 is a block diagram of exemplary signal processing procedures involved during fingerprint embedding and detection.

FIG. 2 shows an overview of exemplary processes that occur within the fingerprint embedder 102 and within the forensic analyzer 104 of FIG. 1. Some of the concepts used in a fingerprint embedder 102 and a forensic analyzer 104 will now be introduced. The components shown in FIG. 2 use an audio implementation of the subject matter as an example, but it should be noted that the subject matter can also be applied to video media forms, thus the description alternates between audio and video considerations and offers both audio and video implementations of many components. The components and their arrangement as shown in FIG. 2 provide only one example, meant to facilitate the description, and are not intended to limit the subject matter to the illustrated arrangement.

The media signal to be fingerprinted is labeled "x," (where $x \in R^N$), and can be modeled as a vector, where each element of x is an independent identically distributed Gaussian random variable with standard deviation A, i.e., $x_j = N(0, A^2)$. For audio signals in the frequency domain, A is dependent on frequency, and its range typically spans within $A \in \{5, 10\}$ after usual media preprocessing steps, examples of which are described in Darko Kirovski and H. S. Malvar, "Spread-spectrum Audio Watermarking," *IEEE Transactions on Signal Processing*, vol. 51, no. 4, pp. 1020-33, 2003 (the "Spread-spectrum Audio Watermarking" reference), which is incorporated herein by reference.

For images, or visual marks embedded in the discrete cosine transformation (DCT) domain, A depends upon the coefficient index. Since mark estimation is significantly facilitated by object motion in video, the variance of the source signal is typically larger than in audio $A \in \{15, 25\}$ for the same relative fingerprint magnitude.

The subject matter can use different classes of fingerprints, for example class-I and class-II fingerprints. A class-I fingerprint, $w^{(i)}$, uniquely generated for a specific user i, is defined as a spread-spectrum sequence of N independent identically and uniformly distributed random samples $w^{(i)} \in U[-\delta, +\delta]^N$. A class-II fingerprint, $w^{(i)}$, also uniquely generated for a specific user i, is defined as a spread-spectrum sequence of N independent identically distributed random samples $w^{(i)} \in \{\pm\delta\}^N$. Each element $w_j^{(i)}$ of a fingerprint is usually called a "chip." The fingerprinted copy $y^{(i)}$ is created by vector addition: $y^{(i)} = x + w^{(i)}$. Details of these principles are described in the Spread-spectrum Audio Watermarking reference mentioned above, and in U.S. Pat. No. 6,738,744 to Kirovski et al., entitled "Watermark Detection Via Cardinality-scaled Correlation," which is incorporated by reference herein in its entirety.

The source signal vector x can be created from the coefficients of a modulated complex lapped transform (MCLT) 202. (See, H. Malvar, "A modulated complex lapped transform and its application to audio processing," *IEEE International Conference on Acoustics, Speech and Signal Processing*, vol. 3, pp. 1421-4, 1999.) The MCLT 202 can be a 2× over-sampled discrete Fourier transform (DFT) filter bank, used in conjunction with analysis and synthesis windows that provide perfect reconstruction. One implementation uses MCLT analysis blocks with 2048 transform coefficients and 50% overlap. An audibility test 204 prevents fingerprint information from being embedded in parts of a signal block in which the fingerprint itself would be audible. In one implementation, in order to provide robustness to low bit-rate compression, fingerprint chips are added only to coefficients that belong to the 70 Hz-7 KHz frequency sub-band.

Each frequency block 206 of the signal may receive an element of the fingerprint $w^{(i)}$ 208 by vector addition 210. An inverse MCLT ("iMCLT") 212 turns the fingerprinted signal in the frequency domain, for each user i, back into a uniquely fingerprinted copy of the media 116 for that user in the temporal domain.

A "psychoacoustic mask" is a set of techniques used to take advantage of the hearing limits of the human ear. The human auditory system functions according to certain nonlinearities and approximations. For example, even a trained ear cannot detect distortions that are shorter in duration than ten milliseconds because the brain ignores the distortion, providing the sensation of a distortion free sound. So if information is placed into sharp transients by concentrating the energy of the transients, the human ear may not hear it. The subject matter uses psychoacoustic masking to embed fingerprint information where it can least be altered without ruining the media content, and/or where the information is least likely to be heard (or seen, in the case of video) by someone enjoying a performance of the content.

Since most psychoacoustic models operate in the frequency spectrum, fingerprints are embedded and detected in the logarithmic (dB) frequency domain, as described in K. Brandenburg, "Perceptual coding of high quality digital audio," *Applications of Digital Signal Processing to Audio and Acoustics*, Kluwer, 1998 (the "Perceptual coding of high quality digital audio" reference).

Video implementations of the subject matter can use an off-the-shelf image marking algorithm that modulates fingerprints using spread-spectrum, such as that described in I. J. Cox, J. Kilian, T. Leighton, and T. Shamoon, "A secure, robust watermark for multimedia," *Information Hiding Workshop*, pp. 183-206, 1996. In this case, the fingerprint embedder 102 embeds the spread-spectrum sequences in the DCT domain of an image. Embedding fingerprints in different domains such as the log-polar, the Fourier-Mellin, or the Radon transform, is not required as in "blind" detection scenarios due to video implementations of the synchronizer 218 (to be discussed in greater detail below) that performs an alignment procedure before fingerprint detection. In one implementation, embedding a fingerprint in the wavelet domain may improve visual smoothness of the added information.

The fingerprint embedder 102 may tile each image into 32×32 pixel DCT blocks. For each DCT coefficient, the fingerprint embedder 102 considers those DCT coefficients with the same index but from neighboring DCT blocks within the same frame, as well as within "C" preceding and succeeding frames. The standard deviation of A of this set of up to 9(2C+1) coefficients is computed and the fingerprint magnitude is determined as a $\delta=A/10$. Each coefficient may have a distinct fingerprint magnitude. In order to improve fingerprint imperceptibleness, low frequency/high energy DCT coefficients are not marked. Two distinct fingerprint frames can be smoothly transitioned across a sequence of 2C+1 video frames. In order to prevent estimation attacks, C can be limited to a small number, typically $2 \leq C \leq 4$.

In one implementation, in which original media 110 has been attacked by a group of colluding pirates, the illustrated forensic analyzer 104 obtains a modified version ŷ 124 of one or more colluded fingerprinted signals $\hat{y}=a(\{y^{(i)}, i \in K\})$. The synchronizer 218 (to be discussed in greater detail below) aligns the pirated copy with the original copy of the media. A signal block 220 of the realigned pirated copy undergoes an MCLT process 222 and an audibility test 224 similar to that described above with respect to the fingerprint embedder 102. The original copy 110 likewise undergoes similar MCLT 226 and audibility test 228 processing. Frequency blocks of the realigned pirated copy and the original copy (230 and 232, respectively) are compared 234 to obtain the candidate fingerprint $w_{(pirate)}^{(i)}$ 236 embedded in the realigned attacked content 124.

Psychoacoustic masking functions 238, 240 are also applied to frequency blocks 230, 232 of the realigned attacked content 124 and to corresponding frequency blocks of the original content 110 to produce psychoacoustic filter masks 242, 244, which are joined 246 into a combined psychoacoustic mask 248. Facilitated by the psychoacoustic mask 248, a correlator or fast convolution engine, such as a fast Fourier transform correlator 250, performs a normalized correlation (i.e., tries to match) the fingerprint 236 recovered from the realigned attacked content 124 with the fingerprint uniquely assigned to each user i in the user database 128. Each attempted correlation may return a positive or negative result 252. If the forensic analyzer 104 returns a pilot fingerprint, then in one implementation the task is then reduced to correlating the fingerprint with each user in a small group associated with the pilot fingerprint.

With regard to the aforementioned collusion attack, the set of users in the collusion clique can be denoted as κ with cardinality κ and an attack function of a(·). Next, w·v denotes the normalized inner product of vectors w and v, that is, $w \cdot v \equiv N^{-1} \Sigma w_j v_j$ with $w^2 \equiv w \cdot w$. The correlator 250 of the forensic analyzer 104 then performs the normalized correlation (or matched filter) test:

$$d_T^{(i)} = c(f(\hat{y},x), w^{(i)}) = ([f(\hat{y},x) - x] \cdot w^{(i)})/(w^{(i)})^2 \quad (1)$$

against the fingerprint $w^{(i)}$ 208 of each user i in the user database U 128. Function $f(\cdot)$ denotes the pirate-to-original alignment function performed by the synchronizer 218 to be described in greater detailed below with respect to FIG. 6. Then, using a comparison test, such as a classical Neyman-Pearson hypothesis test, the correlator 250 decides that a certain user i participated in κ if the user's fingerprint $w^{(i)}$ 208 yields $d_T^{(i)} > \Delta_T$. The detection threshold $\Delta_T$ controls tradeoff between the probabilities of Δ false positive and false negative decisions. For example if $\hat{y}=y^{(i)}$, then $d_T^{(i)}=1$. Also, for $\hat{y}=y^{(i)}$, $E[d_T^{(j)}]=0, j \neq i$. Since the noise in the detector is Gaussian due to the Central Limit Theorem for both class-I and class-II fingerprints, the error probabilities of false negatives and positives are computed by integrating the tail of a corresponding Gaussian probability density function. Modulation and detection theory points out that the correlation detector 250 is optimal in the class of linear detectors in the presence of independent identically distributed noise. (See, H. L. Van Trees, *Detection, Estimation, and Modulation Theory Part I*, New York, John Wiley and Sons, 1968.)

Exemplary Fingerprint Embedder

Figure 3:
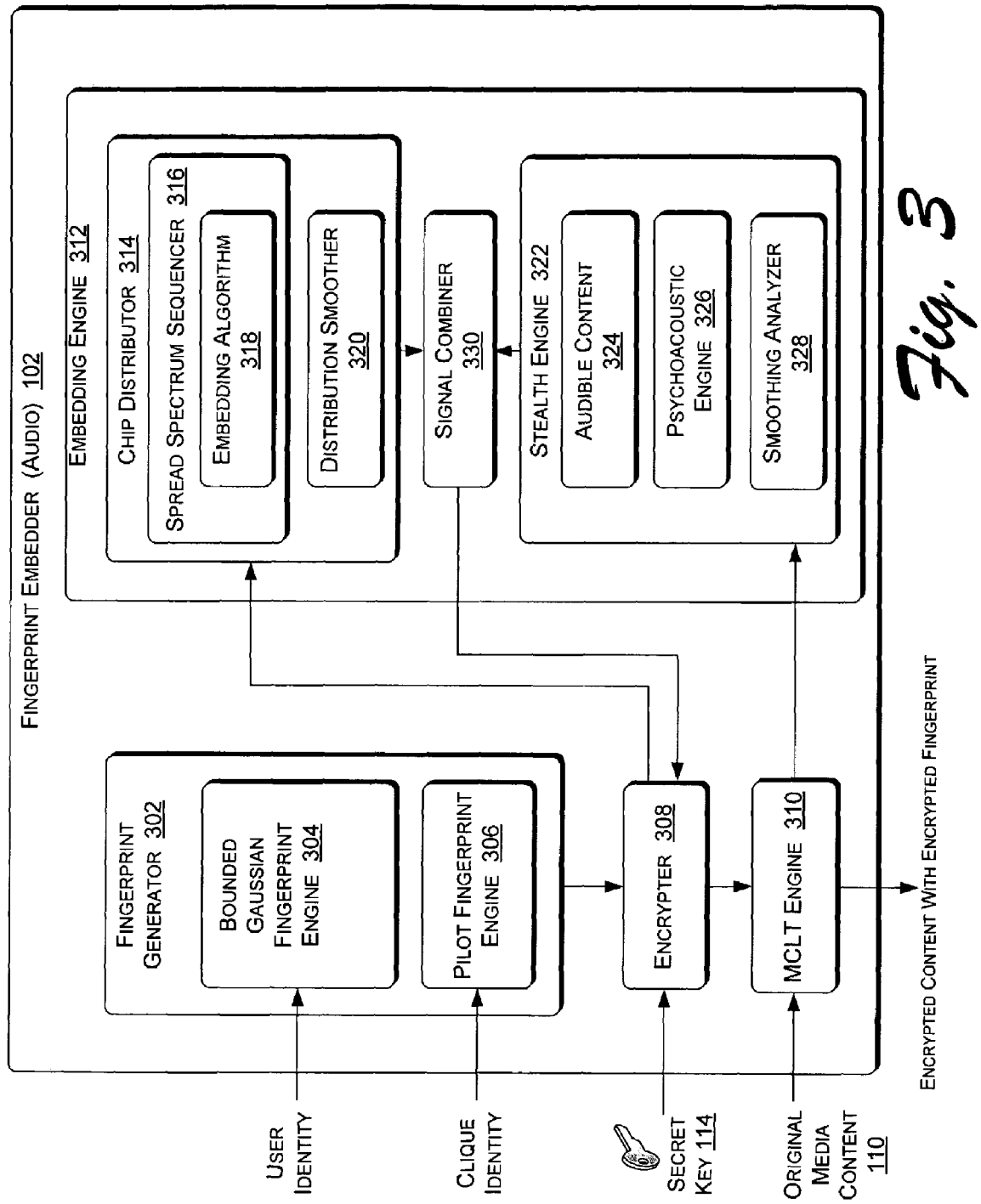
FIG. 3 is a block diagram of an exemplary fingerprint embedder.

FIG. 3 shows an exemplary fingerprint embedder 102 in greater detail than in FIGS. 1 and 2. The components and their arrangement shown in FIG. 3 use an audio implementation of the subject matter as an example, but the subject matter can also apply to video media. These components and their arrangement are meant to facilitate the description, and are not intended to limit the subject matter.

A fingerprint embedder 102 may include a fingerprint generator 302 that further includes a Gaussian fingerprint engine 304 and a pilot fingerprint engine 306. Thus, in one implementation, the fingerprint generator 302 generates a fingerprint $w^{(i)}$ 208 for an individual user that also includes a pilot fingerprint to indicate a group of users that includes the individual user. Generation of the pilot fingerprint will be discussed more fully below. An encrypter 308 may also be included to apply encryption to the fingerprint $w^{(i)}$ 208 using a secret key 114, and in one implementation can also encrypt the media content after the encrypted fingerprint has been added.

An MCLT engine 310 can be configured to transform the encrypted original media content 110 from the temporal domain to the frequency domain, and subsequently to transform a uniquely fingerprinted media copy 116 from the frequency domain back into the temporal domain.

An embedding engine 312 adds the fingerprint $w^{(i)}$ 208 to the media. In one implementation, a chip distributor 314 processes the encrypted fingerprint $w^{(i)}$ 208 for embedding, and thus may include a spread-spectrum sequencer 316 that typically uses a spread-spectrum embedding algorithm 318.

The chip distributor 314 may also include a distribution smoother 320 to "soften the edges" created by embedded chips, e.g., by providing more gradual transitions between the alteration in a block caused by an embedded chip and neighboring parts of the block, or media signal. For example, in an implementation that adds each fingerprint chip to the central coefficient in a tile matrix of coefficients, the smoothing may be accomplished by adding attenuated values of the fingerprint chip to coefficients in each matrix that are adjacent to the central coefficient. In one implementation, the distribution smoother 320 may gather smoothing parameters from a smoothing analyzer 328 to be discussed below.

A stealth engine 322 may be included in the embedding engine 312 and may include several components to process the media content, now in the frequency domain, for rendering the fingerprint to be embedded as imperceptible as possible. An audible content detector 324 may try to determine frequency ranges on which to embed the chips, avoiding frequency ranges or parts of blocks that are prone to attacks on the fingerprint $w^{(i)}$ 208. Ideally, the fingerprint is married to the signal in such a way that alteration of the fingerprint $w^{(i)}$ 208 also degrades the quality of the media content when it is performed in analog form for humans. If the fingerprint were merely added in a frequency band that the humans normally cannot detect, then it would be a small matter to remove the fingerprint and recover the original content unscathed.

In one implementation, the audible content detector 324 performs the audibility test(s) (e.g., 204, 224, 228) of FIG. 2 on a block-by-block basis. If a block or part of a block is determined to be inaudible during performance, then a fingerprint chip is not embedded in such an inaudible part of a block. That is, spread-spectrum fingerprints can be audible when embedded in the MCLT domain even at low magnitudes (e.g., $\delta<1$ dB). This can happen in blocks where certain parts (up to 10 ms) are quiet, whereas the remainder of the block is rich in audio energy. Since the fingerprint spreads over the entire MCLT block, it can cause audible noise in the quiet portion of the MCLT block. Using a technique adopted from the "Spread-spectrum Audio Watermarking," reference cited above, the audible content detector 324 detects such blocks and avoids modifying them with fingerprint information.

Similarly, a psychoacoustic engine 326 may use filters and algorithms to embed fingerprint chips as unobtrusively, inaudibly, and/or invisibly as practical. In other words, in an audio setting, a psychoacoustic engine 326 embeds the fingerprint information as audible variances that are too short, too close in frequency, too negligible, etc. for the human ear to discern. As a comparison, the audible content detector 324 tries to find audible parts of the signal in which to anchor fingerprint information, and the psychoacoustic engine 326 tries to embed the fingerprint information in a manner that minimizes detection by human perceptual systems. In other words, in an audio context, these two components try to add the fingerprint only to content that will be heard but in a manner that the fingerprint itself will not be heard. Analogous components perform analogous functions in a video context.

A smoothing analyzer 328 may be included in the stealth engine 322 to analyze the signal for potential smoothing and edge softening parameters that can be used when embedding chips. The manner of smoothing used to make embedded chips more imperceptible may depend on stealth modalities implemented by the audible content detector 324 and the psychoacoustic engine 326. Of course, the actual manner of smoothing a fingerprint over audio frequencies to which the human ear and brain vary in responsiveness is analogous to the manner of smoothing a fingerprint over visual textures that vary in their impact on the human visual system, although the smoothing mechanisms vary.

For example, in one video implementation, the source signal vector is extracted from the time and frequency matrix by tiling it with 3×3 coefficient tiles, that is, each tile has a matrix of nine coefficients. The central coefficient $x_j$ in each tile is marked with the value of the corresponding chip $w_j^{(i)}$. The remainder of the coefficients in the same tile are marked with fingerprint values that smoothen the fingerprint across tile boarders (in one implementation, only the central coefficient $x_j$ is actually used for detecting a fingerprint).

Figure 4:
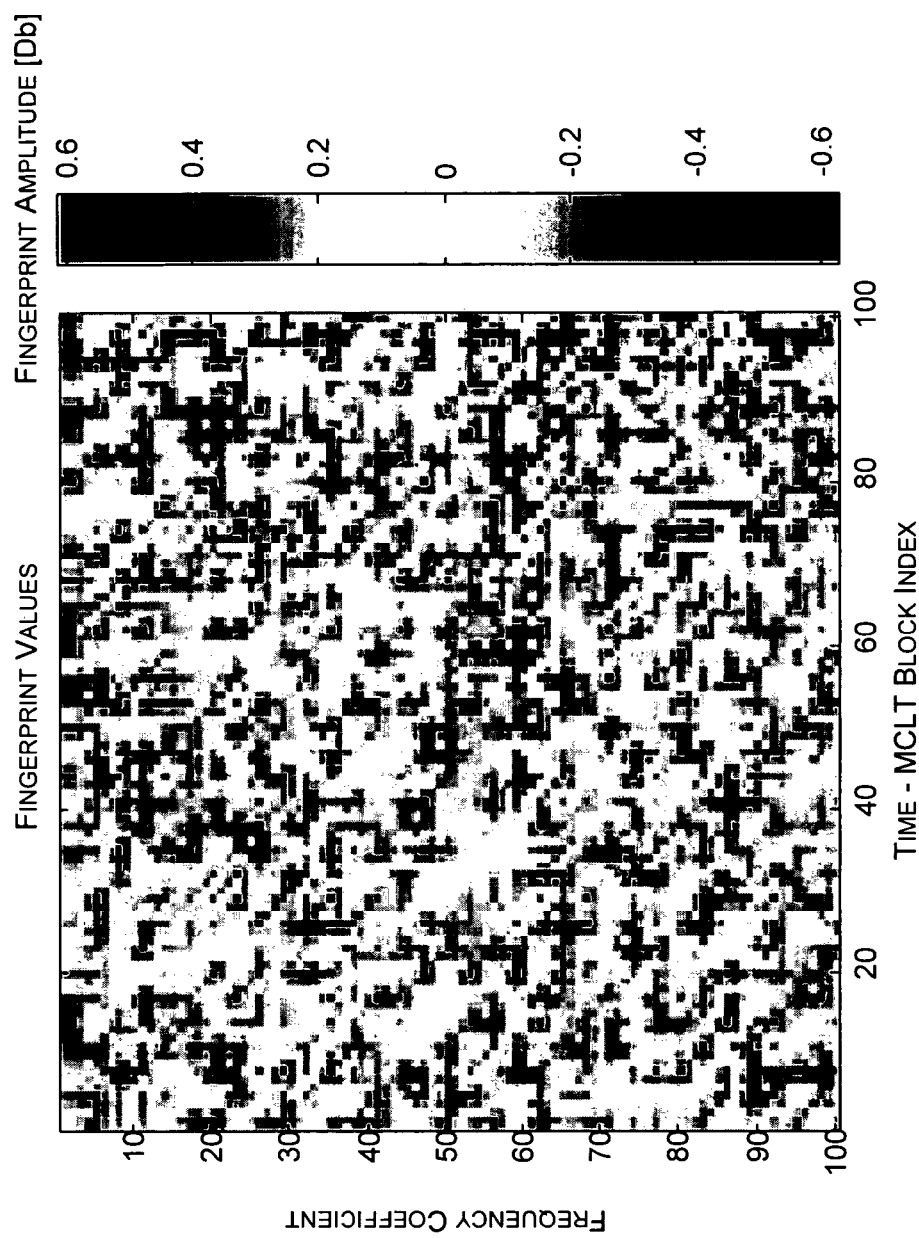
FIG. 4 is a diagram of an exemplary fingerprint showing exemplary smoothing.

An example of a subset of class-I fingerprint values added to several tiles of coefficients is depicted in FIG. 4. The time-frequency matrix of class-I fingerprint values is shown in decibels for the first 100 marked coefficients in the first 100 blocks of an audio clip. The tile size is 3×3 coefficients. The distribution smoother 320 ubiquitously surrounds each "point" coefficient value resulting from an embedded chip with values that are very close to the embedded chip amplitude, changing the value gradually in relation to distance from the embedded chip value. To the attack tools of a potential pirate, this causes each point chip value to appear more like an area instead of a point, i.e., it is more difficult to ascertain the chip value. Chips are replicated across the time-frequency plane in a smoothed manner for several reasons: improved imperceptibleness, increased robustness to slight intra-block de-synchronization during fingerprint detection, and better resilience with respect to the estimation attack, as described in the Spread-spectrum Audio Watermarking reference cited above.

A signal combiner 330 embeds the fingerprint, for example, by vector addition of the value of the fingerprint signal and the value of the media signal in the part of signal receiving a part of a spread-spectrum fingerprint. The MCLT engine 310 or an additional MCLT engine transforms the fingerprinted signal from the frequency domain back into the temporal domain, thereby producing, in this implementation, the media content with an encrypted spread-spectrum fingerprint, which further includes a pilot fingerprint.

Exemplary Pilot Fingerprint Schema

Figure 5:
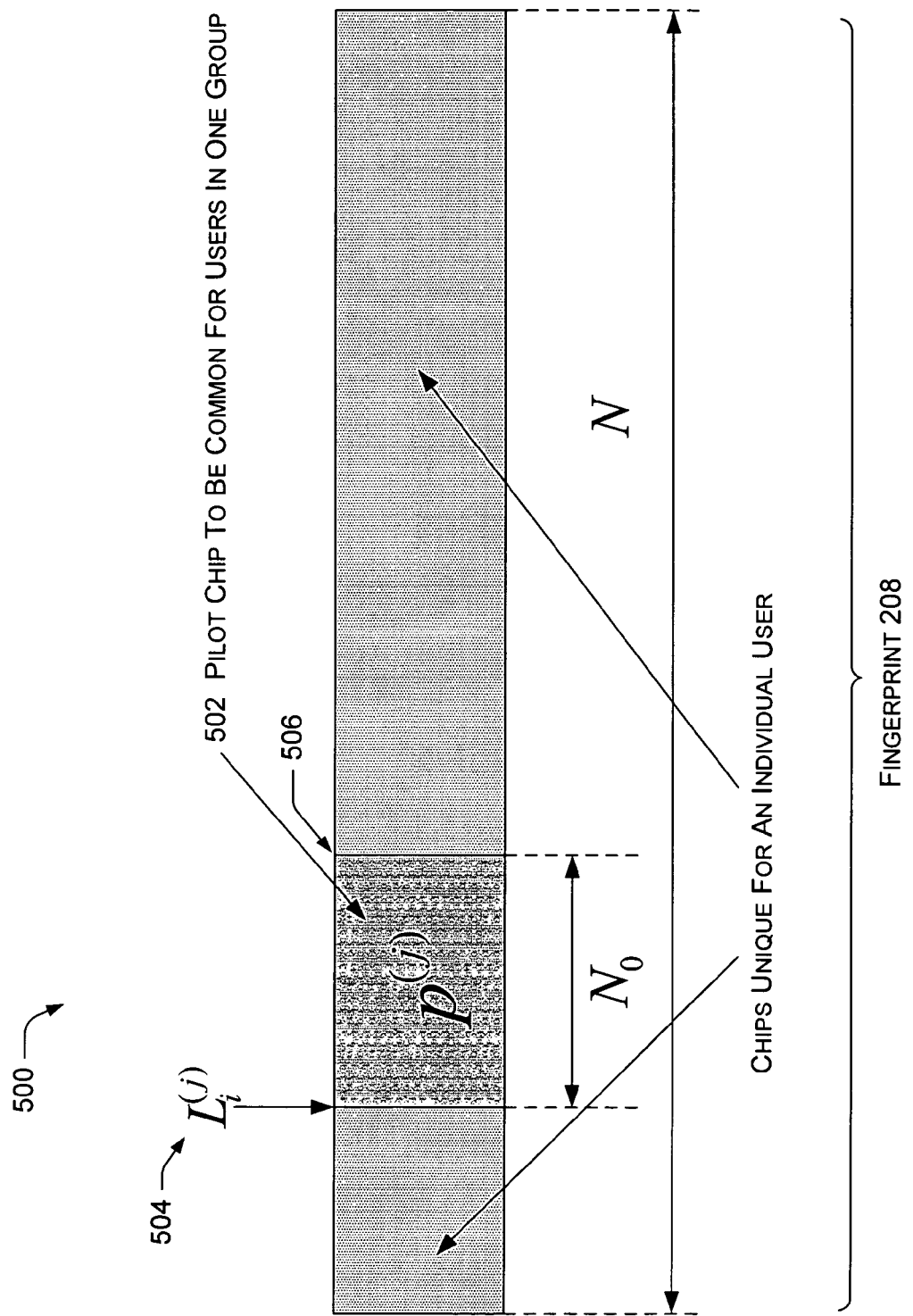
FIG. 5 is a diagram of an exemplary pilot fingerprint.

FIG. 5 shows an exemplary pilot fingerprint schema 500. Pilot fingerprints comprise a new class of phase-shifted spread-spectrum marks embedded in media content for forensic purposes. A pilot fingerprint $p^{(j)}$ 502, uniquely generated for a specific group of users $g_j \in U$, is defined as a spread-spectrum sequence of $N_0$ independent identically distributed random samples of class-I, $p^{(j)} \in U[-\delta, +\delta]^{N_0}$, or class-II, $p^{(j)} \in U[\pm\delta]^{N_0}$. Typically, $N_0 < N/2$. Hence, a pilot fingerprint 502 has the same distribution in a media signal as the conventional fingerprints defined above with respect to FIG. 2. A set of fixed pilot locations (e.g., $L^{(j)}$ 504) are defined as pointers to the original content x such that each pointer is within $0 \leq L_i^{(j)} < N - N_0$ and there is some minimum distance $\theta$ between any two pointers $\forall L_i^{(j)}, L_k^{(j)} \in L^{(j)} |L_i^{(j)} - L_k^{(j)}| > \theta$. A fingerprint $w^{(i)}$ 208 for a given user i who belongs to user class $g_j$, is now redefined such that part of the original fingerprint $w^{(i)}$ 208 as defined with respect to FIG. 2 above, from $L_i^{(j)}$ 504 through a $L_i^{(j)} + N_0$ position 406 is now replaced with the corresponding pilot $p^{(j)}$ 502 placed starting from position $L_i^{(j)}$ 504. The fingerprint 208 and its pilot 502 may or may not be of the same class.

The cardinality of $L_i^{(j)}$ 504 must be greater or equal to the cardinality of $g_j$. Clearly, each user $i \in g_j$ is uniquely associated with its corresponding location $L_i^{(j)}$ 504. The pilot shifts must be apart at least $\theta$ elements, where typically $\theta > 50$. In addition, in order to avoid block desynchronization issues several first multiples of $\theta$ should not be divisible by MCLT block size and its immediate neighboring integers.

Each fingerprinted media copy $y^{(i)}$ 116 is created by vector addition: $y^{(i)} = x + w^{(i)}$. Fingerprint detection is performed for each pilot fingerprint class $p^{(j)}$ 502. The extracted vector $u = f(\hat{y}, x) - x$ is convolved with the complex conjugate of $p^{(j)}$ 502 using a fast Fourier transform (FFT)-based finite impulse response (FIR) filter that relies upon the overlap-add method, as described in A. V. Oppenheim and R. W. Schafer, *Discrete-time signal processing*, Prentice-Hall, 1989.

The complexity of this detection procedure is $O(N \log N_0)$, yielding Equation (5):

$$\text{Speed}_{pilot\ detector} = O\left(\frac{|\mu|}{G \log(N_0)}\right)(\text{Speed}_{conventional\ fingerprint\ detector}). \quad (5)$$

Equation (5) thus describes a detection performance for pilot fingerprint detectors. A pilot fingerprint detector is theoretically 2-3 times faster than a conventional fingerprint detector, where G is the number of user groups in U.)

Exemplary Pilot Fingerprint Engine

Figure 6:
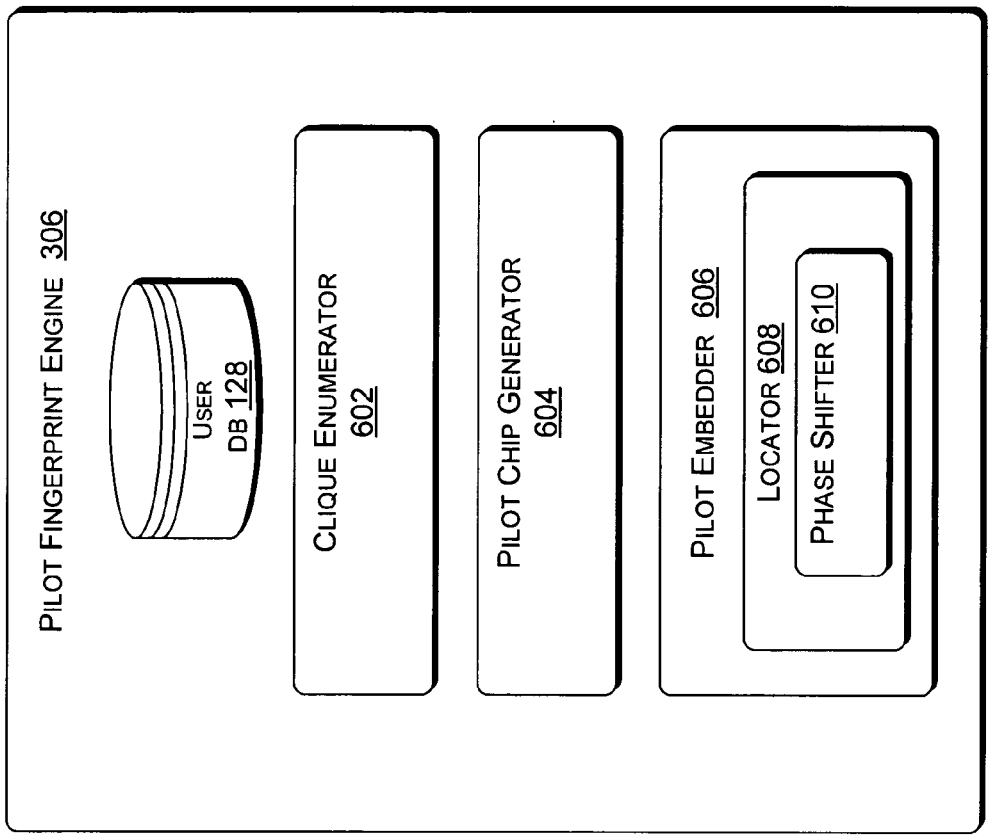
FIG. 6 is a block diagram of an exemplary pilot fingerprint engine.

FIG. 6 shows the pilot fingerprint engine 306 of FIG. 3 in greater detail. Each fingerprint 208 for an individual recipient of proprietary media from a media provider 108 is earmarked with pilot fingerprint 502 that identifies the individual user with a group of users. This feature speeds up detection of a pirate by 2-3 times, because detection and identification of a pilot fingerprint 502 immediately narrows down possible pirates from the set of all possible pirates to just those in one subset. Of course, identification of a subset can have other advantages, such as preventing collusion attacks or rapidly identifying colluding pirates.

A clique enumerator 602 divides the user database U 128 into G groups $g_j$. Each group of users will be represented by one of G pilot fingerprints 502. In other words, one of G pilot fingerprints 502 will be common to all users in a corresponding group $g_j$.

A pilot chip generator 604 produces a value for each pilot fingerprint 502. That is, each pilot fingerprint 502 that the pilot chip generator 604 produces can be a spread-spectrum sequence of $N_0$ independent identically distributed random samples of class-I, $p^{(j)} \in U[-\delta, +\delta]^{N_0}$, or class-II, $p^{(j)} \in U[\pm \delta]^{N_0}$.

A pilot embedder 606 may include a locator 608 and a phase shifter 610. The phase shifter 610 determines a phase increment from a previously placed pilot fingerprint 502 fashioned for a different clique, while the locator 608 determines a location for the current pilot fingerprint 502 within a larger fingerprint 208 that represents an individual in the clique. The fingerprinted copy 116 may be created by applying the inverse MCLT to the altered frequency spectrum of each block. In one implementation, content was fingerprinted by a pilot embedder 606 in about one second per channel-minute for a 2.2 Ghz PENTIUM® IV processor (Intel Corporation, Sunnyvale Calif.). By storing the audio content as MCLT blocks, this process may be sped up approximately 50%. If the resulting audio is compressed in the MLT domain, then there is no need for the inverse transform and hence, fingerprinting software can achieve throughput of about 0.15 seconds per channel-minute.

Exemplary Fingerprint Detector

Figure 7:
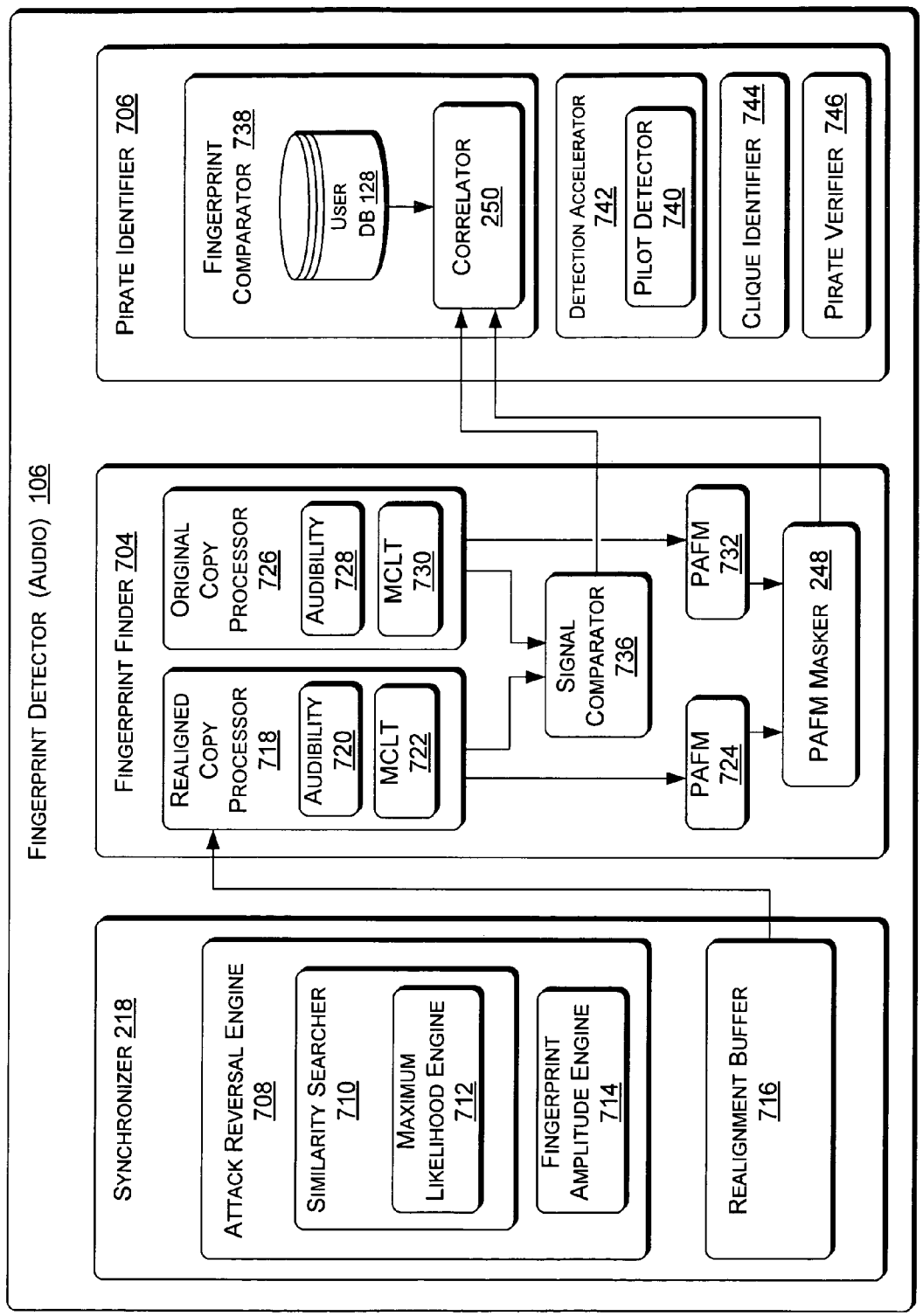
FIG. 7 is a block diagram of an exemplary fingerprint detector.

FIG. 7 shows an exemplary fingerprint detector 106 in greater detail than in FIGS. 1 and 2. The illustrated fingerprint detector 106 receives a pirated copy of fingerprinted media content, realigns the pirated copy with an original copy of the media via a synchronizer 218, and identifies pirates more rapidly than possible with conventional techniques. The components and their arrangement illustrated in FIG. 7 create an audio implementation of the subject matter as one example, but the subject matter can also apply to video media. These components and their arrangement are meant to facilitate the description, and are not intended to limit the subject matter. A fingerprint detector 106 may include the abovementioned synchronizer 218, as well as a fingerprint finder 704, and a pirate identifier 706.

Exemplary Synchronizer

The exemplary synchronizer 218 operates in the time domain and may include an attack reversal engine 708 or other components that act to undo many types of attacks. That is, in synchronizing a pirated copy of media with an original copy, the synchronizer 218 effectively reverses most or all of the effects of an attack on the fingerprint(s).

Since one of the benefits of forensic analysis is the presence of the original media content 110 for fingerprint detection purposes, a maximum likelihood engine 712 executes fast maximum-likelihood synchronization techniques, which will be described herein for both audio and video, to cope with de-synchronization attacks. For audio, a de-synchronization attack is usually waged using non-linear pitch-invariant time-scaling, time-invariant pitch-blending, and time-scaling.

Image de-synchronization attacks (or procedures), on the other hand, typically include randomized geometric distortions such as random bending, rotation, scaling, and cropping. A solid benchmark for image de-synchronization is Stirmark (see, for example, M. Kutter and F. A. P. Petitcolas, "A fair benchmark for image watermarking systems," *Security and Watermarking of Multimedia Contents*, SPIE, vol. 3657, pp. 226-39, 1999).

As mentioned above, since the fingerprint detector 106 has the original copy of the content 110 at its disposal, it can use the original content 110 to reverse the effect of typical de-synchronization attacks, thus, avoiding "blind" fingerprint detection. For the audio attack methods listed above, such attacks include time invariant pitch bending of up to 5%, pitch-invariant time-scaling of up to 10%, and many time-scale and pitch-bending combinations within declared limits (see the Spread-spectrum Audio Watermarking reference cited above.) Wow-and-flutter is usually limited to within 1%. Details on how audio scaling procedures are executed with preservation of high-fidelity, can be found in an article by J. Laroche, "Time and pitch scale modification of audio signals," *Applications of Digital Signal Processing to Audio and Acoustics*, editor K. Brandenburg, Kluwer, 1998.

In video implementations, parameters of geometric transforms should vary only minimally across a sequence of images in order to achieve fingerprint imperceptibleness. Such geometric perturbations that maintain image quality are often found encapsulated in high quality image de-synchronization attacks to video signals.

A similarity searcher 710 includes a maximum likelihood engine 712 to find a part of the pirated signal 124 that matches the original signal, in order to begin realignment of the signals. Different techniques may be attempted or combined to find similarity between pirated and original media copies, because different types of attacks may have been used to produce the pirated copy. For example, a fingerprint amplitude engine 714 may simply or not so simply change the amplitude of the pirated signal to find a match with the original signal. A realignment buffer 716 may be included to store intermediate versions of the attacked content, as the similarity searcher 710 compares various windows of the attacked content with corresponding windows of the original.

Synchronizer—Exemplary Audio Implementation

In one implementation, a synchronizer 218 for realigning audio multimedia performs several actions. The synchronizer 218 divides a block of the multimedia signal into n samples, and identifies a search window in the altered copy where the block is likely to be matched, dividing the search window into samples too. The synchronizer 218 then searches for a matching block in the altered copy by correlating each of multiple time-scaled distributions of the n samples with different trial parts of the altered content defined by the search window. In a worst case scenario, the synchronizer 218 "tries out" each different time-scaled distribution of the n samples on every possible potential corresponding block in the search window—a very processor intensive task requiring an iteration of the synchronizer for each try. However, it is not difficult to determine that a corresponding block in the altered copy will still be fairly close to the location of the block in the original, as pirates usually attack fingerprints with very subtle variations. Once a first match is made, then scalars that can be used to make subsequent blocks match are known, hence relatively few iterations of the synchronizer 218 are then used.

The synchronizer 218 can then realign the altered copy with the multimedia signal by producing a sequence of these corresponding blocks. The current size and location of the search window for matching a current block of the multimedia signal with a corresponding block of the altered copy can be adjusted based on a quality of a previous match and based on a previous time scale used to achieve the previous match.

Description of the synchronizer 218 in an audio context will now be given in greater detail. In order to synchronize the pirated copy ŷ 124 with respect to the original content x 110, a similarity searcher 710 may execute the following alignment algorithm $f(ŷ, x)$. For each original block B of length $n_o$ samples, the similarity searcher 710 first generates all of a block's time-scales of concern $\Psi(B, \psi)$. Block size $n_o$ is typically 2048 or 4096 for content sampled at 44.1 kHz. Scalar $\psi$ is a scaling factor, typically $\psi \in \{0.90, 0.91, \ldots, 1.10\}$. Function $\Psi(B, \psi)$ resamples B, $\psi$ times along the time axis without preserving the pitch. (Several algorithms for resampling with rational factors can be used, such as fast linear scaling, which has achieved solid detection results). Next the similarity searcher 710 identifies a search window S in the pirated copy with the length $n_s > n_o$, where B is likely to be matched. The matching process accommodates the maximum normalized correlation:

$$\{j_m, \psi_m\} = \arg\max_{\{j,\psi\}} h(S(j, \lceil n_o\psi \rceil), \Psi(B, \psi)) \quad (2)$$

where S(j, l) denotes an l-long sub-block in S starting from and including the sample $S_j$, function $h(a, b) \equiv n(a \cdot b)/(\|a\| \cdot \|b\|)$ denotes normalized cross-correlation of two n-long vectors a and b and operator $\|a\|$ denotes the L2-norm of a. The test returns the location index $j_m$ in search block S which represents the first sample of a block $S_m = S(j_m, \lceil n_o\psi_m \rceil)$ that optimally matches B, when scaled with $\psi_m^{-1}$. For each block B, the similarity searcher 710 returns the block $\Psi(S_m, \psi_m^{-1})$ as the resulting aligned block. A sequence of these blocks is denoted as $f(ŷ, x)$.

The location and size of the current search window $S_k$ is determined based on the match achieved in the previous blocks. If $B_{k-1}$ was matched with high confidence in $S_{k-1}$ at absolute location $J_{k-1}$, then it is estimated that the location of $B_k$ in $S_k$ is at $j_k = j_{k-1} + \lceil n_o\psi_{k-1}, m \rceil$, where $\psi_{k-1}$, m is the scaling factor of the optimal match for block $B_{k-1}$. Hence, in this case, $S_k$ is constrained to a relatively small search window that starts at $j_{k-\epsilon}$, and ends shortly after $j_k + n_o \max(\psi) + \epsilon$, where $\epsilon$ represents a relatively small search region (e.g., $\epsilon \approx 1\text{-}2K$ samples).

In case $B_k$ is not matched with high confidence in a given $S_k$, the similarity searcher 710 ignores this block for further processing, i.e., $S_{k,m} = \{0\}^N$, and further maintains an "early start" and "late ending" position estimate for future iterations. The early start estimate is incremented by $\xi'_{k+1} = \xi'_k + \lceil n_o \min(\psi) \rceil$ samples, and the late ending estimate by $\xi''_{k+1} = \xi''_k + 2\lceil n_o \max(\psi) \rceil$ samples. For a first unmatched block $B_{k+1}$ in a sequence, $\xi'_k = \xi''_k = j_k$ is obtained, where $B_k$ is the last block that has been matched with high confidence. The search window is then defined as $S(\xi'_{k+1} - \epsilon, \xi''_{k+1} + \epsilon)$. Finally, a high confidence match is quantified by thresholding the correlation function from Equation (2) above, with $h(\cdot) > \tau$, where typically $\tau > 0.85$.

Synchronizer—Exemplary Video Implementation

In a video implementation, the exemplary synchronizer 218 synchronizes a pirated image with an original image using several additional techniques compared to its audio counterpart described above. Due to the three-dimensional nature of the image data, searching for all possible geometric transforms is a computational task of high complexity.

In one implementation, a synchronizer 218 divides a multimedia signal and an altered copy of the multimedia signal into tiles or image blocks, e.g., that represent squares or matrices of pixels. The synchronizer 218 then selects a conspicuous image block within the multimedia signal (or image) to be a starting block for a search in the altered copy. An edge detector 822 can be used to find a conspicuous starting block. A similarity searcher 710 in the synchronizer 218 searches for a matching block in the altered copy by correlating each of multiple transformed versions of the starting block with different parts of a limited search region of the altered copy. The similarity searcher 710 then identifies a transform, and also a corresponding block in the altered copy that substantially matches the block in the multimedia signal when the corresponding block is scaled with the transform.

The synchronizer 218 then searches and/or scans in a pattern for more corresponding blocks, for example, in concentric circles extending from the first correlated block. In this manner, the synchronizer 218 realigns the altered copy with the multimedia signal by producing a sequence (or array) of the corresponding blocks.

An important part of this process is finding one or more best fitting geometric transforms that correlate blocks of the altered copy with blocks of the original multimedia content. If the transform(s) give favorable correlative results and/or behave consistently to yield good correlation with high confidence, then the current size and location of the search region for matching a current block of the multimedia signal with a corresponding block of the altered copy can be reduced, speeding up the process immensely. The attack vector revealed by the transform(s) that give good correlation can be used to correlate blocks between temporally consecutive video frames.

Figure 8:
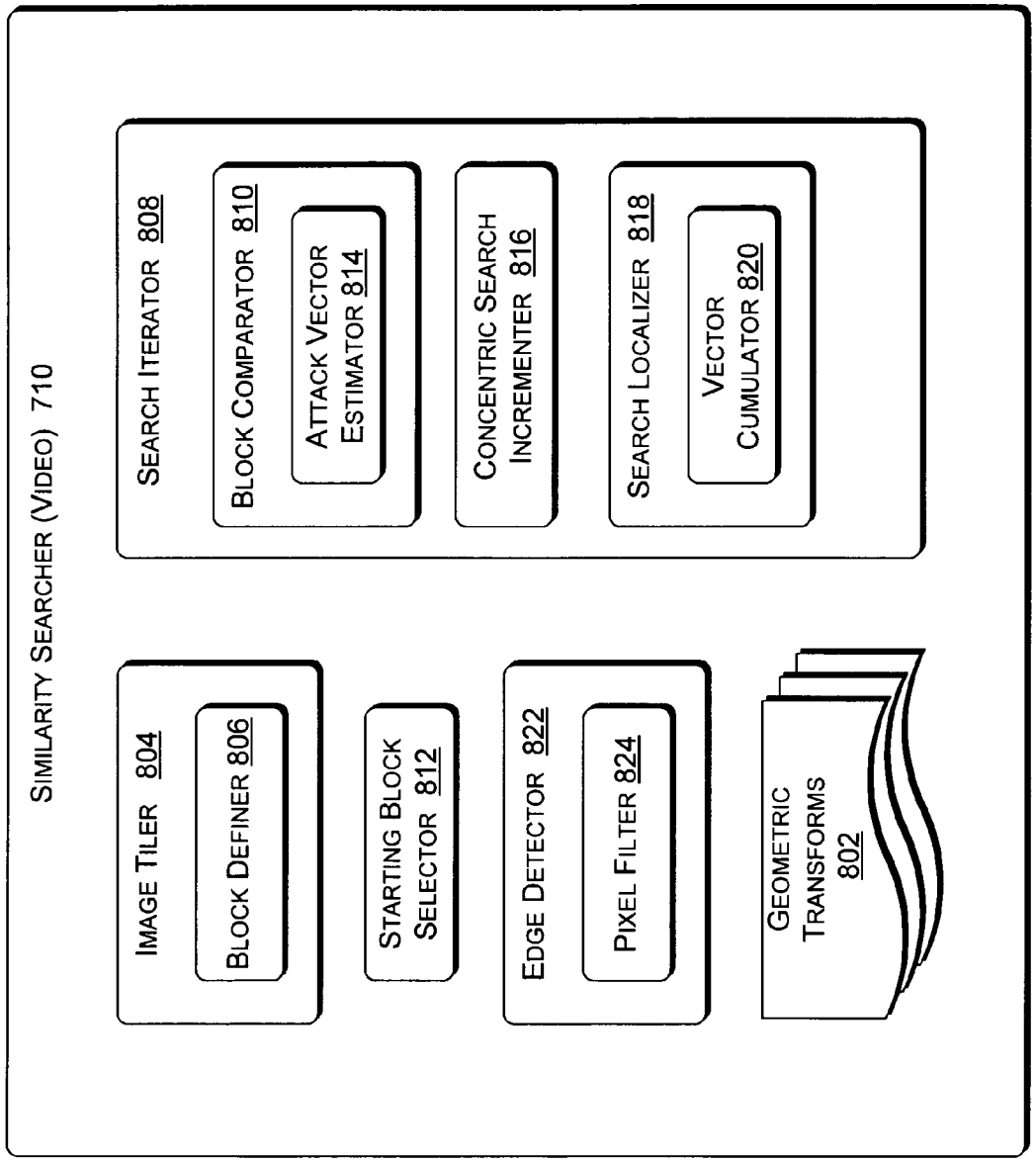
FIG. 8 is a block diagram of an exemplary similarity searcher.

FIG. 8 shows an exemplary video implementation of the similarity searcher 710 of the synchronizer 218. In this video context, the similarity searcher 710 searches for a best fitting geometric transform 802 to synchronize a pirated copy with an original image. An image tiler 804 tiles the original image I[x, y] in blocks $B = \{b_i, i = 1 \ldots, |B|\}$. A block definer 806 may designate block size, for example, 32×32 or 64×64 pixels. In a search iterator 808, a block comparator 810 searches in the pirated copy for a correlation with each individual block $b_i$. For each frame, a starting block selector 812 determines a select block $b_s$ at which to begin the search. This starting block can be selected in a preprocessing step. The similarity searcher 710 performs an exhaustive search over the entire space of considered geometric transforms T 802. In one implementation, $|T| = 3$, and the following linear scalars for determining a best match are defined: $t_1 \in$ (T—rotation within $\{\pm 6\%\}$ in steps of 2%); $t_2 \in$ (T—linear scaling along the x and y axis with independent factors within $\{0.9, 1.1\}$ in steps of 0.025); and $t_3 \in$ (T—linear bending along each dimension and side with all factors in $\{0.90, 0.95, 1.00, 1.05, 1.10\}$). In this implementation, the total number of transform combinations 802 considered per block equals 20,412.

The similarity searcher 710 searches the original transformed block in a search region $R_S$ centered at the original placement of $b_S$ and with nine times greater area. The best match is identified by the highest normalized correlation peak with respect to $R_S$:

$$\tau_S = \{t_1^S, t_2^S, t_3^S\} = \arg\max_{x,y,\tau \in T} \tau(b_S) \odot R_S[x, y], \quad (3)$$

where $\odot$ denotes normalized correlation and $R_S[x, y]$ denotes a window in $R_S$ positioned at the x and y coordinates and of size equal to $b_S$.

An attack vector identifier 814 seeks the best fitting geometric transform 802, and once this attack vector $\tau_S$ for $b_S$ is identified, a concentric search incrementer 816 directs the search iterator 808 to iteratively continue the search in concentric circles around $b_S$. A search localizer 818 includes a vector cumulator 820. For each succeeding block $b_i$, the vector cumulator 820 averages out the attack vectors of the neighboring, already processed blocks. The resulting averaged attack vector can be denoted as $\bar{\tau}_i = \{\bar{t}^i_1, \bar{t}^i_2, \bar{t}^i_3\}$, which can be used to direct the search localizer 818 to perform the search process for $b_i$ only in the locality of $\bar{\tau}_i$. The search localizer 818 considers significantly fewer test vectors; and also considers significantly smaller search regions in the pirated image, typically only twice the size of $b_i$, as the positioning of well-matched neighboring blocks is taken into account.

Two aspects of the above-described similarity searcher 710 result in faster performance of a synchronizer 218 than conventional techniques. First, the selection criteria implemented by the starting block selector 812 may facilitate increased speed—i.e., the selection of an efficient starting block $b_S$. Second, the search localizer 818 also increases speed by optimizing the domain where the search is performed as in Equation (3). In one implementation, the objective for the selection of $b_S$ can be described as distinct negative correlation of $b_S$ with respect to its locality. More formally, the starting block selector 812 seeks $b_S$ such that:

$$b_S = \arg\min_{b_i \in [x,y] \neq pos(b_i)} \max \ b_i \odot R_i[x, y], \quad (4)$$

where $pos(b_S)$ returns the coordinates of $b_S$ within $R_S$. Intuitively, by enforcing this objective, the starting block selector 812 selects blocks that are not correlated with their neighborhood. Since this starting block search can be done in a preprocessing step, the starting block selector 812 may perform the search in an exhaustive fashion.

In one implementation, an edge detector 822 is used on both the original O and pirated P images to produce edge maps E[O] and E[P] respectively. In addition, the edges on E[P] may be thickened using an axa pixel filter 824 with a $\epsilon$ $\{3, 6\}$. Thus, normalized correlation of a select block $b_i$ from E[O] with its location in the corresponding search region in E[P], is tolerant to small scale rotations, scalings, and bendings. By computing the normalized correlations on images that denote detected edges, the similarity searcher 710 is able to isolate (from the search that aims at the remaining part of the attack vector) the best linear scaling, $t_1$, of a given block. The search for the best $t_1$ match is performed using a block $b_i$ extracted from E[O] and using a search region $R_i$ from E[P]. The remaining search process uses the regular output on $R_i$, not the thickened edge output.

Within and across consecutive frames in a video sequence, the attack vectors of individual blocks must preserve a significant degree of smoothness. This information can be used to apply the attack vectors from one frame to the next one. In addition, the attack vector identifier 814 can preserve a pool of several most likely attack vectors for each block and then perform a simple belief propagation process to maximize the smoothness of attack vectors in all three dimensions. If poor or non-distinct correlation is reported for a given block $b_i$, the similarity searcher 710 may mark this block as non-recoverable and reset its pixels values. In one implementation, the performance of the similarity searcher 710 is less than one second for the first frame in a scene. Synchronizing successive frames that inherit the attack vectors from previous ones is twice as fast as this.

Figure 9:
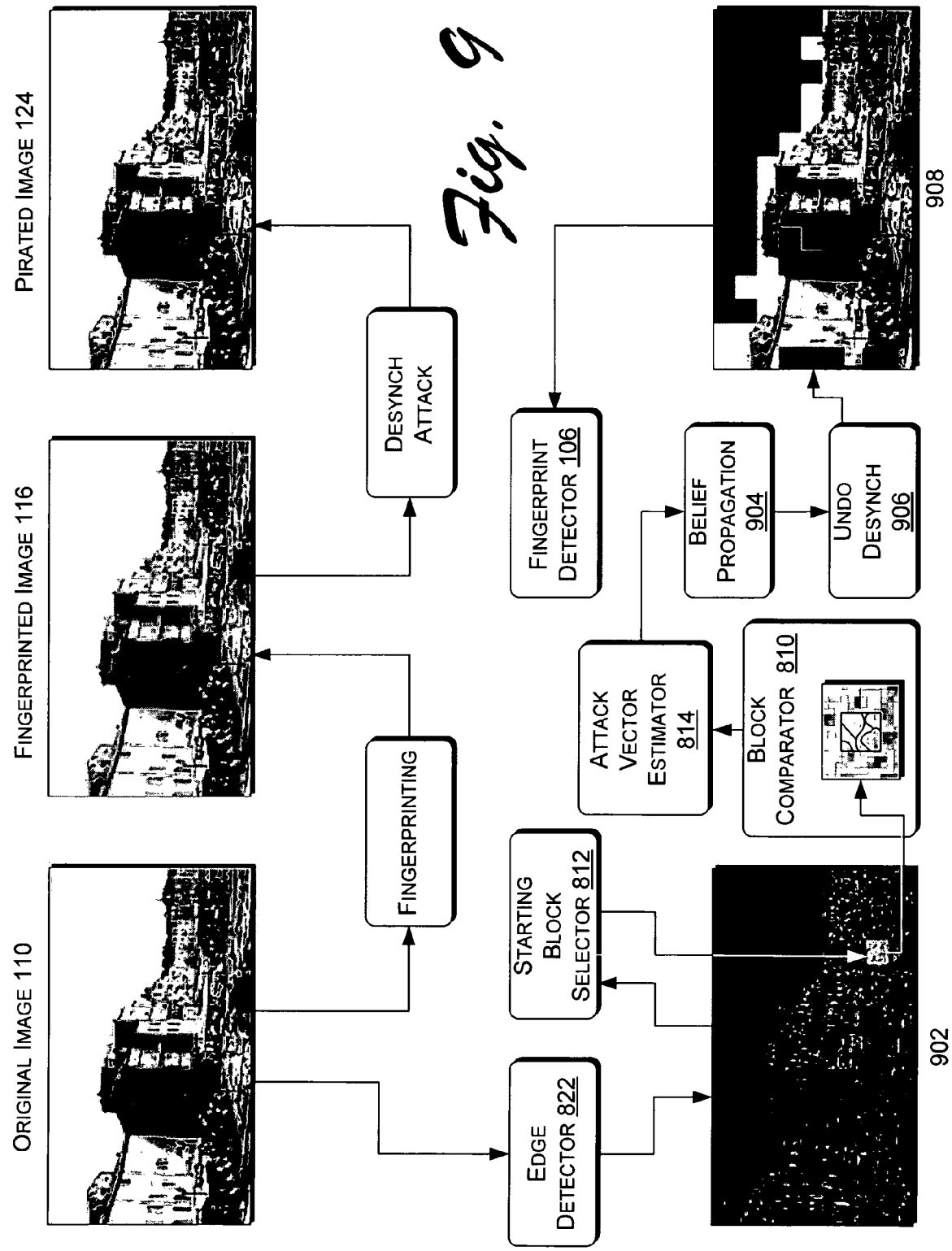
FIG. 9 is a flow diagram of exemplary processes performed with respect to exemplary forensic analysis.

FIG. 9 shows exemplary process flow between several of the components of the similarity searcher 710. In one implementation, an edge detector 822 produces an edge map 902 of an original image 110. The starting block selector 812 finds a starting block that stands out as different from surrounding blocks, i.e., makes a good landmark for finding a corresponding block in a pirated image 124. An attack vector estimator 814 identifies and/or estimates attack parameters. Several likely attack vectors for each block can be saved and subjected to a belief propagation process 904 to maximize the smoothness of attack vectors in all three dimensions. Non-distinct correlation between a given pirate block and original block may result in the block being marked as non-recoverable and its values being reset. The best fitting attack vector(s) are used to undo 906 the desynchronization attack. The fingerprint detector 106 obtains the identity of a group of users and the identity of the pirate included in the group of users, from the realigned pirated copy 908.

Exemplary Fingerprint Finder

Returning to FIG. 7, once an original media copy 110 and a pirated copy 124 are realigned by the synchronizer 218 described above, the fingerprint finder 704 lifts the fingerprint, now made readable by the synchronizer 218, from the pirated copy 124, or more precisely, from comparison(s) made between the pirated copy 124 and the original 110.

In an audio implementation of the fingerprint finder 704, a realigned copy processor 718 subjects each synchronized block of the pirated copy to a fingerprint audibility tester 720. If a fingerprint in the block is audible, this block is ignored. Otherwise, the block is subjected to a MCLT converter 722 to be transformed to the MCLT domain. Then, a psychoacoustic masking function 724 is applied to determine which frequency coefficients in this block are audible, as described in the "Perceptual coding of high quality digital audio" reference cited above. On the average, typically only one half of all coefficients in an MCLT block are audible.

The same procedure is repeated for the corresponding block of the original media content 110. At an original copy processor 726, each synchronized block of the original copy 110 is subjected to a fingerprint audibility tester 720. If a fingerprint in the block is audible, this block is ignored. Otherwise, the block is subjected to a MCLT converter 730 to be transformed to the MCLT domain. Then, a psychoacoustic masking function 732 is applied to determine which frequency coefficients in this block are audible If both blocks satisfy the fingerprint inaudibility requirement, their audibility masks are conjuncted at a PAFM masker 248, and the resulting mask is used to zero-out the corresponding coefficients of the original and pirated block. A signal comparator 736 may also subtract pre-PAFM blocks of the original content 110 from pre-PAFM blocks of the pirated content 124 for input to a correlator 250.

Exemplary Pirate Identifier

As described above with respect to FIG. 1, a correlator 250, such as a fast Fourier transform convolution engine, performs a normalized correlation between the fingerprint information forwarded by the fingerprint finder 704 and fingerprints uniquely assigned to each user i in the user database 128.

In one video implementation, only the center coefficients of each coefficient tile matrix are used to extract the signal vectors $\hat{y}$ and x, these are fed to the correlator 250 to compute $d_T^{(i)}$ from Equation (1) above for each user i, in U, the database of users 128. Assuming certain properties of the attack function a(·), the resulting convolutions should reveal the clique K that includes a pirate, with high probability.

Exemplary Pilot Detector

Fingerprint detection is performed for each pilot fingerprint class $p^{(j)}$ 502, as described above with respect to FIG. 5. In one implementation, the extracted vector $u=f(ŷ, x)-x$ is convolved with the complex conjugate of $p^{(j)}$ 502 using a fast Fourier transform (FFT)-based finite impulse response (FIR) filter that relies upon the overlap-add technique. A pilot fingerprint detector 740 residing in a detection accelerator 742 part of the pirate identifier 706 checks for the existence of all G pilot fingerprints. That is, the user database 128 has been divided into G groups and a pilot fingerprint 502 assigned to each group at a unique fixed pilot position 504. The pilot detector 740 checks to see if any of these pilot fingerprints assigned to the G groups are present at their assigned positions relative to a spread-spectrum fingerprint 208 that identifies an individual user in one of the groups. Upon detecting a pilot fingerprint $p^{(j)}$, based upon its location in the pirated content 124, a clique identifier 744 identifies one of the G groups of users.

However, in order to make a final decision in finding an individual pirate, the pirate verifier 746 also detects in the vector u the remaining part of the corresponding fingerprint $w^{(i)}$ 208 for each user i in the detected group who is actually a member of the set of pirates, i.e., for a collusion attack. If the fingerprint match from Equation (1) above is positive, then the pirate verifier 746 declares user i as a participant in the attack clique K. The pirate verifier 746 prevents almost deterministically the false incrimination of an innocent user by a malicious clique which has calculated a pilot fingerprint with great accuracy.

It should be noted that an adversarial pirate clique can identify the pilot fingerprint using content cross-correlation and estimation. By computing exclusively the pilot fingerprint, adversaries cannot incriminate innocent users; they can only prevent a forensic analyzer 104 from detecting the fingerprint in the pirated copy.

Exemplary Method

FIG. 10 shows an exemplary method 1000 of detecting a media pirate. In the flow diagram, the operations are summarized in individual blocks. The method 1000 may be performed in various software and hardware implementations, for example, by components of the fingerprint embedder 102 or forensic analyzer 104.

At block 1002, a first fingerprint is embedded in a multimedia signal in order to identify a recipient of the multimedia signal, for example a recipient who pirates the multimedia signal by altering and/or illicitly distributing the multimedia signal. Of course, the multimedia signal is usually copyrighted audio and/or video content. The first fingerprint can be a spread-spectrum watermark that points out the identity of the recipient-potential pirate, for example, by using an encrypted part of the recipient's credit card number, etc.

At block 1004, a second fingerprint, i.e., a pilot fingerprint, is embedded in a location relative to the first fingerprint that identifies a subset of a universe of recipients who receive the multimedia signal. The pilot fingerprint can be made vanishingly small, and can be embedded only sparsely in the multimedia signal, to help thwart detection and alteration by pirates. In one implementation, the content of the pilot fingerprint is irrelevant, as it is the location of the pilot within the first fingerprint that uncovers the subset that includes the recipient-pirate.

Because pirated content is usually altered in order to render fingerprints ineffective, each detected fingerprint may have to be correlated against the database of known fingerprints of recipients in the overall universe of recipients, a time consuming proposition. By finding the subset first, via the pilot fingerprint, the search for an individual pirate against a voluminous database of recipients is sped up 2-3 times.

At block 1006, the location of a pilot fingerprint is detected. The detection may involve realigning an altered, pirated, desynchronized copy of the multimedia signal with an original copy. Both audio and video content can be resynchronized with original copies using maximum likelihood techniques that correlate blocks of altered content with original content via scalars or transforms. The detection of a location of a pilot fingerprint reveals a subgroup of recipients that includes the pirate-recipient.

At block 1008, the first fingerprint is read from the pirated multimedia signal to individually identify a pirate from among the recipients in the subgroup revealed by the second fingerprint. Since the pirate's identity and a group membership of the pirate are both revealed in this method 1000, it is difficult and improbable for a group of colluders to overcome this method 1000 of detecting a multimedia pirate by altering fingerprint(s) to frame an innocent third party.

Experimental Results

This section of the description shows empirical results of the effect of desynchronization attacks on detection of the fingerprints. Several test attacks are shown in Table (1):

TABLE 1

| Type of Test | Characteristics | Wow-and-Flutter |
|---|---|---|
| A | No attack | None |
| B | Time stretched 10% with preserved pitch | 1% |
| C | Frequency blending 5% with preserved time scale | 1% |
| D | Time scale 5% | 1% |
| E | Time scale 5% with additive Gaussian white noise of -20 dB | 1% |

The test attacks enumerated in Table (1) were applied to each member of a benchmark of audio selections, consisting of the following clips shown in Table (2):

TABLE 2

| Artist | Album | Clip |
|---|---|---|
| ACE OF BASE | Ultimate Dance Party 1999 | Cruel Summer (Blazin' Rhythm Remix) |
| STEELY DAN | Gaucho | Babylon Sisters |
| PINK FLOYD | The Wall | Comfortably Numb |
| DAVE MATTHEWS BAND | Crash | Crash Into Me |
| — | — | Generic Classical Piece |

Ten different fingerprints were embedded for each attack-song pair resulting in the following worst-case probability of false positive p, shown in Table (3):

TABLE 3

| Type of Test | Characteristics | Worst Case Probability "p" of False Positive |
|---|---|---|
| A | No attack | $p \ll 2 \cdot 10^{-308}$ |
| B | Time stretched 10% with preserved pitch | $p < 10^{-82}$ |
| C | Frequency blending 5% with preserved time scale | $p < 10^{-52}$ |
| D | Time scale 5% | $p < 10^{-55}$ |
| E | Time scale 5% with additive Gaussian white noise of -20 dB | $p < 10^{-55}$ |

The performance attribute p was measured by recording the correlation peak $d_T^{max}$, the standard deviation $\sigma_n^2 = \text{Var}(d_T)$ for all correlations returned by the overlap-add convolution, and then setting $$p = \frac{1}{2}\text{erfc}\left(d_T^{max}/(\sigma_n\sqrt{8})\right).$$

In all tests with $|K|=1$, the forensic analyzer 104 detected the fingerprints with high confidence.

Thus, the collusion resistance for the two classes of fingerprints presented in this manuscript, is constant $K=O(1)$, i.e., invariant of object size. This is significant improvement over conventional techniques with respect to averaging and the max-min attack which both enable the forensic analyzer 104 to seek for colluders' traces that result from the design of their attack vectors. By using a fingerprint which is sufficiently long, the forensic analyzer 104 can detect all colluders in the case of such an attack. For comparison, a gradient attack removes all traces of the adversarial clique from the perspective of conventional detectors. Finally, in one implementation, the fingerprinting system increases efficiency by randomizing and hiding certain details (e.g., secret and varying δ) during the fingerprint embedding process. Fingerprinting systems which target multimedia with vast amount of data such as movies, can improve the collusion resistance by using better codes, such as the Boneh-Shaw codes, at the cost of being prone to framing attacks. (See, D. Boneh and J. Shaw, "Collusion-secure fingerprinting for digital data," *IEEE Transactions on Information Theory*, vol. 44, no. 5, pp. 1897-1905, 1998.)

These results show that the fingerprinting and forensic technology described herein may be applied with high efficacy on smaller user sets or sets where collusion is unlikely. In the latter case, the pilot fingerprints achieve pirate detection that is several times faster than conventional techniques during forensic analysis.

CONCLUSION

The foregoing discussion describes an exemplary forensic for fingerprint detection in multimedia. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method having instructions executable by a processor, comprising:
   embedding a first fingerprint in an multimedia signal to produce a fingerprinted multimedia signal for identifying an individual recipient of the fingerprinted multimedia signal, wherein the multimedia signal comprises audio content;
   embedding a second fingerprint in the first fingerprint, wherein the second fingerprint is capable of identifying a group of recipients of the fingerprinted multimedia signal, wherein the group includes the individual recipient; and
   synchronizing an altered copy of the fingerprinted multimedia signal, with the multimedia signal, to recover from the altered copy, at least some information associated with the second fingerprint, wherein the synchronizing comprises:
   dividing a block of the multimedia signal into n samples;
   identifying a search window in the altered copy, where the block is likely to be matched and dividing the search window into samples;
   searching for a matching block in the altered copy, by correlating multiple time-scaled distributions of the n samples with different parts of the altered copy defined by the search window; and
   identifying a time scale and a corresponding block in the altered copy, wherein the corresponding block substantially matches the block in the multimedia signal when the corresponding block is scaled with the identified time scale.

2. The method as recited in claim 1, wherein the first and second fingerprints are bounded Gaussian spread-spectrum fingerprints.

3. The method as recited in claim 1, further comprising assigning one of multiple phase shifted locations within the first fingerprint to the second fingerprint, wherein each of the phase-shifted locations identifies a different group of recipients within an overall group of recipients of the multimedia signal.

4. The method as recited in claim 1, further comprising:
   detecting a location of the second fingerprint within the first fingerprint to identify the group of recipients that includes the individual recipient; and
   detecting at least part of the first fingerprint in the fingerprinted multimedia signal to identify the individual recipient from among the other recipients in the group identified by the second fingerprint.

5. The method as recited in claim 1, further comprising realigning the altered copy with the multimedia signal by producing a sequence of the corresponding blocks.

6. The method as recited in claim 1, further comprising adjusting a current size and location of the search window for matching a current block of the multimedia signal with a corresponding block of the altered copy based on a quality of a previous match and based on a previous time scale used to achieve the previous match.

7. The method as recited in claim 6, further comprising using an edge detector for selecting the conspicuous start block.

8. The method as recited in claim 1, further comprising:
   representing the multimedia signal as a series of sectioned coefficient tiles;
   embedding the first and second fingerprints as values in central sections of multiple of the sectioned coefficient tiles; and
   embedding attenuated values of the first and second fingerprints in non-central sections of the multiple sectioned coefficient tiles to smoothen a transition between the embedded fingerprint values and non-embedded parts of the multimedia signal.

9. The method as recited in claim 1, further comprising detecting substantially empty parts of the multimedia signal in which the first and second fingerprints are capable of being audible or visible to a human and avoiding embedding the first and second fingerprints in the detected parts.

10. A fingerprinting system for a multimedia content, comprising:
    a first spread-spectrum signal capable of being embedded in the multimedia content to identify an individual recipient of the multimedia content, wherein the multimedia content comprises a video signal;

a second spread-spectrum signal embedded in the first spread-spectrum signal to identify a subset of a group of recipients of the multimedia content, wherein the subset includes the individual recipient; and a synchronizer to realign an altered copy of the multimedia content with an original copy of the multimedia content, wherein the synchronizer comprises a similarity searcher to:

divide the multimedia signal and the altered copy into image blocks;

select a conspicuous image block of the multimedia signal to be a starting block for a search;

search for a matching block in the altered copy by correlating each of multiple transformed versions of the starting block with different parts of a search region of the altered copy;

identify a transform and a corresponding block in the altered copy, wherein the corresponding block substantially matches the block in the multimedia signal when the corresponding block is scaled with the transform; and realign the altered copy of the multimedia signal with the multimedia signal by producing an array of the corresponding blocks.

11. The fingerprinting system as recited in claim 10, further comprising a detector for locating the second spread-spectrum signal in an altered copy of the multimedia content, correlating the located second spread-spectrum signal with the subset of recipients, and correlating the first spread-spectrum signal with an individual recipient in the subset.

12. The fingerprinting system as recited in claim 10, wherein the similarity searcher further includes an edge detector to select the starting block.

13. The fingerprinting system as recited in claim 10, further comprising a stealth engine to:

embed the first and second spread-spectrum signals in the multimedia content such that the first and second signals are imperceptible to a human during a performance of the multimedia content; and smoothen the embedded first and second signals in relation to the multimedia content.

14. A system, comprising:

means for embedding a first electronic watermark in a multimedia content to identify a recipient of the multimedia content, wherein the multimedia content comprises an audio signal;

means for embedding a second electronic watermark in the first electronic watermark to represent a subset of a group of recipients of the multimedia content, wherein detection of a location of the second watermark in the first watermark narrows a search for the recipient down to the subset; and means for synchronizing an altered copy of the multimedia content with the multimedia content, to recover from the altered copy at least some information associated with the second electronic watermark, wherein the synchronizing comprises:

dividing a block of the multimedia content into n samples;

identifying a search window in the altered copy where the block is likely to be matched and dividing the search window into samples;

searching for a matching block in the altered copy by correlating multiple time-scaled distributions of the n samples with different parts of the altered copy defined by the search window; and identifying a time scale and a corresponding block in the altered copy, wherein the corresponding block substantially matches the block in the multimedia content when the corresponding block is scaled with the identified time scale.

15. The system as recited in claim 14, further comprising means for realigning an altered copy of the multimedia content that includes the first and second electronic watermarks with an original copy of the multimedia content, wherein the realignment facilitates detection of at least the second electronic watermark.

16. A computer implemented method having instructions executable by a processor, comprising:

embedding a first fingerprint in an multimedia signal to produce a fingerprinted multimedia signal for identifying an individual recipient of the fingerprinted multimedia signal, wherein the multimedia signal comprises video content;

embedding a second fingerprint in the first fingerprint, wherein the second fingerprint is capable of identifying a group of recipients of the fingerprinted multimedia signal, wherein the group includes the individual recipient; and synchronizing an altered copy of the fingerprinted multimedia signal with the multimedia signal to recover from the altered copy at least some information associated with the second fingerprint, wherein the synchronizing comprises:

dividing the multimedia signal and the altered copy into image blocks representing pixel tiles;

selecting a conspicuous image block of the multimedia signal to be a starting block for a search;

searching for a matching block in the altered copy by correlating each of multiple transformed versions of the starting block with different parts of a search region of the altered copy; and identifying a transform and a corresponding block in the altered copy, wherein the corresponding block substantially matches the block in the multimedia signal when the corresponding block is scaled with the transform.

17. The method as recited in claim 16, further comprising realigning the altered copy with the multimedia signal by producing an array of the corresponding blocks.

18. The method as recited in claim 17, wherein producing an array of the corresponding blocks includes identifying one or more best fitting transforms and searching for corresponding blocks near the starting block using the one or more best fitting transforms to transform each image block of the multimedia signal for the searching.

19. The method as recited in claim 16, further comprising adjusting a current size and location of the search region for matching a current block of the multimedia signal with a corresponding block of the altered copy based on a quality of a previous match and based on the previous one or more best fitting transforms used to achieve the previous match.

20. The method as recited in claim 19, further comprising averaging the one or more best fitting transforms for multiple blocks in a search region.

21. The method as recited in claim 20, further comprising using the averaged transforms to identify matching blocks across consecutive video frames.

* * * * *